United States Patent
Lin et al.

(10) Patent No.: US 12,489,370 B2
(45) Date of Patent: Dec. 2, 2025

(54) LOW POWER CONSUMPTION FEEDBACK CIRCUIT FOR POWER SUPPLY DEVICE

(71) Applicant: Power Forest Technology Corporation, Hsinchu County (TW)

(72) Inventors: Yu-Chao Lin, Hsinchu (TW); Kuan-Chun Fang, Hsinchu County (TW); Zhi-Yang Zhang, Tainan (TW); Chien-Wei Kuan, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 247 days.

(21) Appl. No.: 18/366,707

(22) Filed: Aug. 8, 2023

(65) Prior Publication Data

US 2025/0023443 A1  Jan. 16, 2025

Related U.S. Application Data

(60) Provisional application No. 63/521,856, filed on Jun. 19, 2023.

(30) Foreign Application Priority Data

Jul. 13, 2023  (TW) ................. 112126176

(51) Int. Cl.
*H02M 3/335* (2006.01)
*H02M 1/00* (2007.01)
*H02M 3/00* (2006.01)

(52) U.S. Cl.
CPC ..... *H02M 3/33523* (2013.01); *H02M 1/0025* (2021.05); *H02M 3/01* (2021.05)

(58) Field of Classification Search
CPC ............. H02M 3/335; H02M 3/33523; H02M 3/33553; H02M 1/0025
See application file for complete search history.

(56) References Cited

U.S. PATENT DOCUMENTS 5,995,384 A * 11/1999 Majid ............... H02M 3/33523
                                                323/902
7,161,783 B2 * 1/2007 Yoshida .................. H02M 1/32
                                                361/93.7

(Continued)

FOREIGN PATENT DOCUMENTS

| TW | 201639281 | 11/2016 |
|---|---|---|
| TW | M654740 | 5/2024 |
| WO | 02087051 | 10/2002 |

OTHER PUBLICATIONS

"Office Action of Taiwan Counterpart Application", issued on Nov. 1, 2024, p. 1-p. 5.

*Primary Examiner* — Gustavo A Rosario-Benitez
(74) *Attorney, Agent, or Firm* — JCIPRNET

(57) ABSTRACT

A feedback circuit is used for a power supply device. The power supply device includes a primary side circuit and a secondary side circuit. The feedback circuit includes a feedback voltage generation circuit, a base voltage generation circuit, and a compensation signal generation circuit. The feedback voltage generation circuit is electrically connected to the secondary side circuit. The feedback voltage generation circuit generates a feedback voltage according to a bias voltage and an output voltage of the power supply device. The base voltage generation circuit generates a base voltage according to the feedback voltage. The compensation signal generation circuit generates a compensation signal according to the feedback voltage and the base voltage and provides the compensation signal to a controller in the primary side circuit. A voltage value of the feedback voltage is lower than a voltage value of the bias voltage.

9 Claims, 2 Drawing Sheets

(56) References Cited

U.S. PATENT DOCUMENTS

| | | |
|---|---|---|
| 10,802,564 B2 | 10/2020 | Yang |
| 2005/0242786 A1 | 11/2005 | Sawyers et al. |
| 2006/0055382 A1* | 3/2006 | Cuadra ............. H02M 3/33523 323/280 |
| 2010/0133905 A1* | 6/2010 | Chang ............... H02M 3/33561 307/31 |
| 2011/0013431 A1* | 1/2011 | Chiang .................. H02M 1/36 363/49 |
| 2011/0241638 A1* | 10/2011 | Chan ....................... H02M 1/14 323/282 |
| 2014/0036550 A1* | 2/2014 | Yang ................ H02M 3/33523 363/21.12 |
| 2014/0078789 A1* | 3/2014 | Li ..................... H02M 3/33507 363/21.16 |
| 2014/0159678 A1* | 6/2014 | Park ................. H02M 3/33523 323/229 |
| 2018/0062525 A1* | 3/2018 | Radic ...................... H02M 1/08 |
| 2018/0246556 A1 | 8/2018 | Pasqua et al. |
| 2021/0313792 A1* | 10/2021 | Chan ................ H02M 3/33523 |
| 2021/0313823 A1* | 10/2021 | Chan .................... H02J 7/0047 |
| 2024/0079961 A1* | 3/2024 | Chan .................. H02M 1/0058 |

\* cited by examiner

LOW POWER CONSUMPTION FEEDBACK CIRCUIT FOR POWER SUPPLY DEVICE

CROSS-REFERENCE TO RELATED APPLICATION

This application claims the priority benefit of U.S. provisional application Ser. No. 63/521,856, filed on Jun. 19, 2023, and Taiwan application serial no. 112126176, filed on Jul. 13, 2023. The entirety of each of the above-mentioned patent applications is hereby incorporated by reference herein and made a part of this specification.

BACKGROUND

Technical Field

The disclosure relates to a feedback circuit, and in particular, to a feedback circuit for a power supply device.

Description of Related Art

In general, existing power supply devices may include a feedback circuit. The feedback circuit provides a feedback result directly based on the change of the output voltage of the secondary side circuit. The primary side circuit of the power supply device adjusts the operating parameters based on the feedback result. Therefore, the output voltage may be monitored to provide a stable output voltage value.

However, when the power supply device is a boost circuit, the voltage value of the output voltage may be higher. Therefore, the power consumption of the feedback circuit itself may be relatively high. The efficiency of the power supply device may be reduced due to the high power consumption of the feedback circuit itself. It may be seen from here that how the power consumption of the feedback circuit may be reduced is one of the research focuses of the technical personnel.

SUMMARY

The disclosure provides a feedback circuit for a power supply device, which may reduce power consumption of the feedback circuit.

A feedback circuit of the disclosure is used in a power supply device. The power supply device includes a primary side circuit and a secondary side circuit. The feedback circuit includes a feedback voltage generation circuit, a base voltage generation circuit, and a compensation signal generation circuit. The feedback voltage generation circuit is electrically connected to the secondary side circuit. The feedback voltage generation circuit receives a bias voltage and an output voltage of the power supply device and generates a feedback voltage according to the bias voltage and the output voltage. The base voltage generation circuit is electrically connected to the feedback voltage generation circuit. The base voltage generation circuit provides a base voltage according to the feedback voltage. The compensation signal generation circuit is electrically connected to the feedback voltage generation circuit and a controller. The compensation signal generation circuit generates a compensation signal according to the feedback voltage and the base voltage and provides the compensation signal to the controller in the primary side circuit. A voltage value of the feedback voltage is lower than a voltage value of the bias voltage. The voltage value of the feedback voltage varies with the change of the output voltage.

Based on the above, the feedback voltage generation circuit generates the feedback voltage according to the bias voltage and the output voltage. The voltage value of the feedback voltage is lower than the voltage value of the bias voltage. The voltage value of the feedback voltage varies with the change of the output voltage. The voltage value of the feedback voltage is limited. In this way, the power consumption of the feedback circuit may be reduced. The efficiency of the power supply device may increase due to the low power consumption of the feedback circuit itself.

DESCRIPTION OF THE EMBODIMENTS

Figure 1:
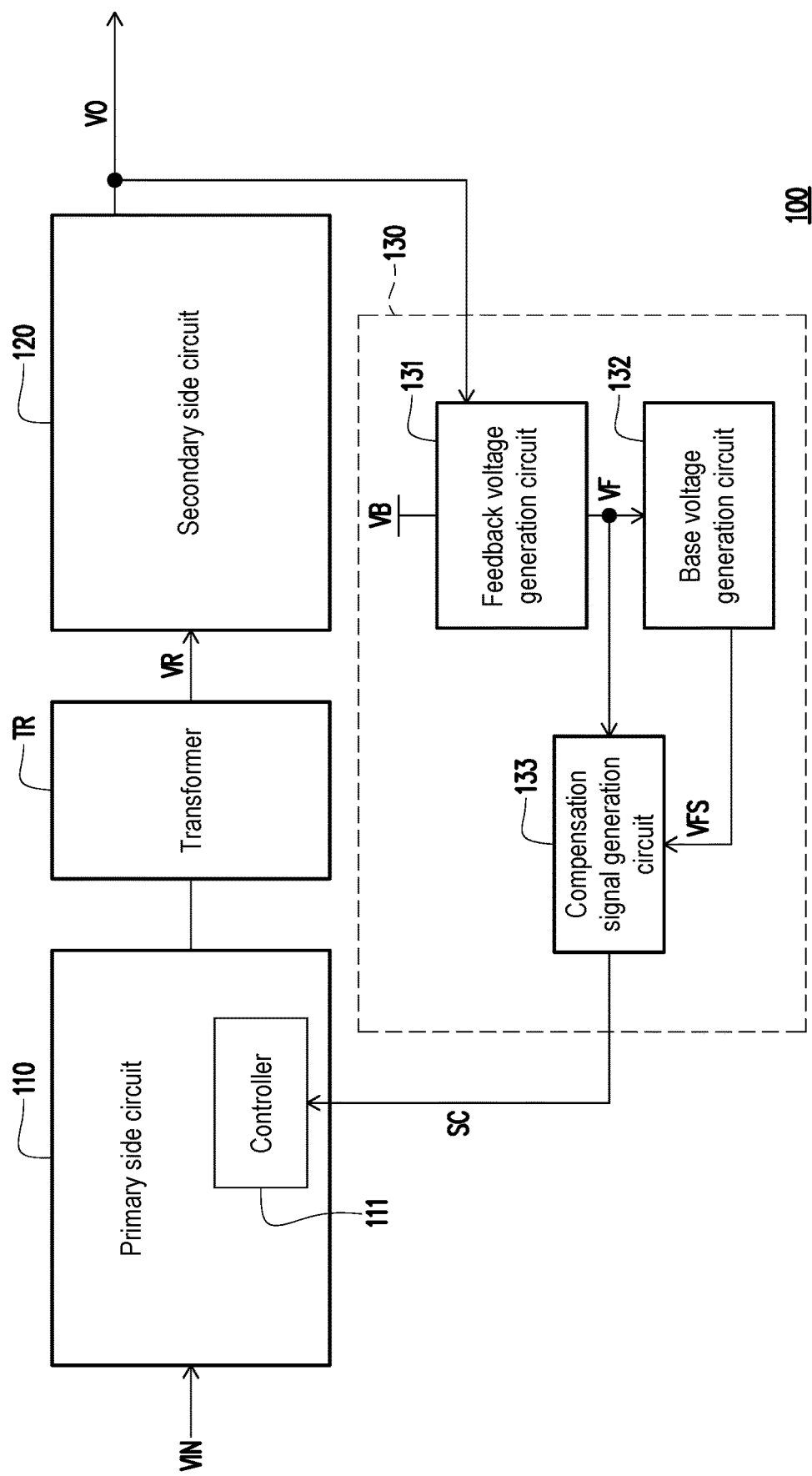
FIG. 1 is a schematic diagram of a power supply device according to an embodiment of the disclosure.

Parts of the embodiments of the disclosure will be described in details with reference to the accompanying drawings. For the reference numerals used in the following description, the same reference numerals appearing in different drawings will be regarded as the same or similar components. These embodiments are only a part of the disclosure and do not disclose all possible implementation modes of the disclosure. Rather, these embodiments are only examples within the scope of the claims of the disclosure.

Please refer to FIG. 1. FIG. 1 is a schematic diagram of a power supply device according to an embodiment of the disclosure. In the embodiment, a power supply device 100 includes a primary side circuit 110, a secondary side circuit 120, and a feedback circuit 130. The primary side circuit 110 receives an input voltage VIN. The power supply device 100 provides a conversion voltage VR according to the input voltage VIN. The secondary side circuit 120 receives the conversion voltage VR and provides an output voltage VO according to the conversion voltage VR. The power supply device 100 may be any form of power conversion circuit. For example, the power supply device 100 may be a boost circuit, a step-down circuit, or an LLC resonant conversion circuit (although the disclosure is not limited thereto). In the embodiment, the power supply device 100 further includes a transformer TR (although the disclosure is not limited thereto). The transformer TR is configured to provide the conversion voltage VR. In the embodiment, the primary side circuit 110 includes a controller 111. For example, the controller 111 may control the switching operations of power transistors (not shown) in the primary side circuit 110. The switching operation of the power transistor may determine the voltage value of the conversion voltage VR.

In the embodiment, the primary side circuit 110 includes the controller 111. The feedback circuit 130 receives the output voltage VO and provides a compensation signal SC according to the output voltage VO. The controller 111 provides corresponding operations in response to the compensation signal SC so as to stabilize the output voltage VO.

In the embodiment, the feedback circuit 130 includes a feedback voltage generation circuit 131, a base voltage generation circuit 132, and a compensation signal generation circuit 133. The feedback voltage generation circuit 131 is electrically connected to the secondary side circuit 120. The feedback voltage generation circuit 131 receives a bias voltage VB and the output voltage VO of the power supply device 100 and generates a feedback voltage VF according to the bias voltage VB and the output voltage VO. The base voltage generation circuit 132 is electrically connected to the feedback voltage generation circuit 131. The base voltage generation circuit 132 generates a base voltage VFS according to the feedback voltage VF. The compensation signal generation circuit 133 is electrically connected to the feedback voltage generation circuit 131 and the controller 111. The compensation signal generation circuit 133 generates the compensation signal SC according to the feedback voltage VF and the base voltage VFS and provides the compensation signal SC to the controller 111.

In the embodiment, the bias voltage VB has a fixed voltage value. The bias voltage VB may be adjusted based on actual usage requirements.

In the embodiment, the voltage value of the feedback voltage VF is lower than the voltage value of the bias voltage VB. The voltage value of the feedback voltage VF varies with the change of the output voltage VO. It is worth mentioning here that the voltage value of the feedback voltage VF is limited by the voltage value of the bias voltage VB. In this way, the power consumption of the feedback circuit 130 may be reduced. The efficiency of the power supply device 100 may increase due to the low power consumption of the feedback circuit 130 itself.

In the embodiment, the voltage value of the feedback voltage VF is related to the voltage value of the output voltage VO. In addition, the compensation signal SC is related to the voltage value of the feedback voltage VF. The controller 111 provides corresponding operations according to the compensation signal SC. For example, the controller 111 uses the control signal to control the primary side circuit 110. The higher the duty cycle of the control signal, the higher the voltage value of the output voltage VO. When the voltage value of the output voltage VO is higher, the voltage value of the feedback voltage VF and the value of the compensation signal SC may be higher. The value of the compensation signal SC may be a voltage value or a current value. The compensation signal SC may be a voltage signal or a current signal. Therefore, when the value of the compensation signal SC increases, the controller 111 may decrease the duty cycle of the control signal in response to the compensation signal SC. On the other hand, when the voltage value of the output voltage VO is lower, the voltage value of the feedback voltage VF and the value of the compensation signal SC may be lower. When the value of the compensation signal SC decreases, the controller 111 may increase the duty cycle of the control signal.

Figure 2:
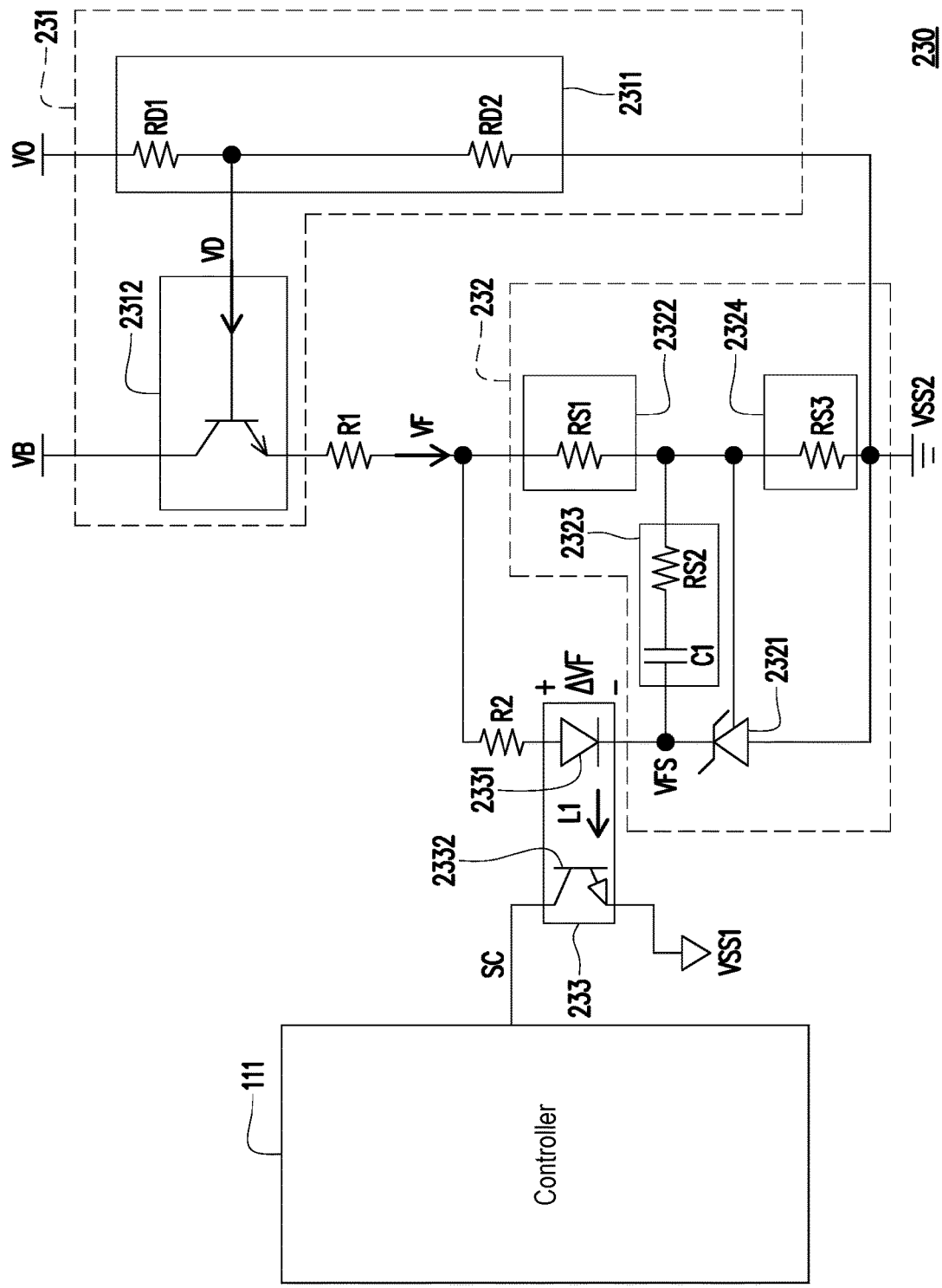
FIG. 2 is a circuit diagram of a feedback circuit according to an embodiment of the disclosure.

Please refer to FIG. 1 and FIG. 2 at the same time. FIG. 2 is a circuit diagram of a feedback circuit according to an embodiment of the disclosure. In the embodiment, a feedback circuit 230 includes a feedback voltage generation circuit 231, a base voltage generation circuit 232, and a compensation signal generation circuit 233. The feedback voltage generation circuit 231 includes a voltage division circuit 2311 and a semiconductor element 2312. The voltage division circuit 2311 divides the output voltage VO to generate a division voltage VD. Therefore, the voltage value of the division voltage VD is positively related to the voltage value of the output voltage VO. The semiconductor element 2312 generates the feedback voltage VF according to the bias voltage VB and the division voltage VD. The voltage value of the feedback voltage VF is lower than the voltage value of the bias voltage VB.

In the embodiment, the first terminal of the semiconductor element 2312 receives the bias voltage VB. The second terminal of the semiconductor element 2312 is electrically connected to the base voltage generation circuit 232. The control terminal of the semiconductor element 2312 receives the division voltage VD. The semiconductor element 2312 is implemented by a bipolar junction transistor (BJT). Taking the embodiment as an example, the semiconductor element 2312 may be implemented by an NPN type BJT. Therefore, the voltage value of the feedback voltage VF at the second terminal of the semiconductor element 2312 is lower than the voltage value of the bias voltage VB at the first terminal of the semiconductor element 2312.

In the embodiment, the voltage division circuit 2311 includes voltage division resistors RD1 and RD2. The first terminal of the voltage division resistor RD1 receives the output voltage VO. The second terminal of the voltage division resistor RD1 is electrically connected to the control terminal of the semiconductor element 2312. The voltage division circuit 2311 provides the division voltage VD through the second terminal of the voltage division resistor RD1. The first terminal of the voltage division resistor RD2 receives the output voltage VO. The second terminal of the voltage division resistor RD2 is electrically connected to a reference low voltage VSS2 of the secondary side circuit 120. The voltage division circuit 2311 limits the division voltage VD within the range of the operating point of the semiconductor element 2312, so that the semiconductor element 2312 may operate.

In the embodiment, the voltage division resistors RD1 and RD2 are designed to have relatively high resistance values. The current value flowing through the voltage division resistors RD1 and RD2 may be reduced. Therefore, the power consumption of the voltage division circuit 2311 may be reduced.

In the embodiment, the base voltage generation circuit 232 includes a voltage stabilizer 2321 and voltage stabilization impedance circuits 2322 to 2324. The voltage stabilizer 2321 provides a base voltage VFS from the first terminal of the voltage stabilizer 2321. The first terminal of the voltage stabilizer 2321 is electrically connected to the compensation signal generation circuit 233. The second terminal of the voltage stabilizer 2321 is electrically connected to the reference low voltage VSS2. The first terminal of the voltage stabilization impedance circuit 2322 is electrically connected to the compensation signal generation circuit 233 and the second terminal of the semiconductor element 2312. The second terminal of the voltage stabilization impedance circuit 2322 is electrically connected to the reference terminal of the voltage stabilizer 2321. The voltage stabilization impedance circuit 2323 is electrically connected between the first terminal of the voltage stabilizer 2321 and the reference terminal of the voltage stabilizer 2321. The voltage stabilization impedance circuit 2324 is electrically connected between the reference terminal of the voltage stabilizer 2321 and the second terminal of the voltage stabilizer 2321.

The voltage stabilization impedance circuit 2322 is implemented by a resistor RS1. The voltage stabilization impedance circuit 2324 is implemented by a resistor RS3. The voltage stabilization impedance circuit 2323 is a resistor-capacitor circuit. The voltage stabilization impedance circuit 2323 is implemented with a resistor RS2 and a capacitor C1 connected in series.

In the embodiment, the voltage stabilizer 2321 determines the reference voltage based on the voltage difference between the reference terminal of the voltage stabilizer 2321 and the second terminal of the voltage stabilizer 2321. Therefore, the reference voltage is fixed at a voltage value. For example, based on the operation of the voltage stabilizer 2321, the voltage value of the reference voltage is stabilized at 2.5 volts (although the disclosure is not limited thereto).

Taking the embodiment as an example, the voltage stabilizer 2321 may be implemented by a "TL431" element (although the disclosure is not limited thereto).

In the embodiment, the compensation signal generation circuit 233 generates a feedback voltage difference value ΔVF according to the voltage value of the feedback voltage VF and the base voltage VFS located at the first terminal of the voltage stabilizer 2321 and generates the compensation signal SC according to the feedback voltage difference value ΔVF. In the embodiment, the feedback voltage difference value ΔVF is positively related to the voltage difference value between the voltage value of the feedback voltage VF and the voltage value of the base voltage VFS. The controller 111 controls the primary side circuit 110 in response to the compensation signal SC. In the embodiment, the compensation signal generation circuit 233 includes a light emitting element 2331 and a photodiode 2332. The anode of the light emitting element 2331 is electrically connected to the first terminal of the voltage stabilization impedance circuit 2322. The cathode of the light emitting element 2331 is electrically connected to the first terminal of the voltage stabilizer 2321. The light emitting element 2331 provides a light signal L1 in response to the feedback voltage difference value ΔVF.

The first terminal of the photodiode 2332 is electrically connected to the controller 111. The second terminal of the photodiode 2332 is electrically connected to a reference low voltage VSS1 of the primary side circuit 110. The receiving terminal of the photodiode 2332 is configured to receive the light signal L1.

In the embodiment, when the voltage value of the output voltage VO increases, the voltage value of the feedback voltage VF may increase, the feedback voltage difference value ΔVF may also increase, and the intensity of the light signal L1 may be greater. This enables the current value of the compensation signal SC flowing through the first terminal of the photodiode 2332 and the second terminal of the photodiode 2332 to increase. Therefore, the controller 111 may reduce the duty cycle of the control signal based on the current value of the compensation signal SC. When the voltage value of the output voltage VO decreases, the voltage value of the feedback voltage VF may decrease, the feedback voltage difference value ΔVF may also decrease accordingly, and the intensity of the light signal L1 may be lesser. This enables the current value of the compensation signal SC flowing through the first terminal of the photodiode 2332 and the second terminal of the photodiode 2332 to decrease. Therefore, the controller 111 may increase the duty cycle of the control signal based on the current value of the compensation signal SC.

In some embodiments, the controller 111 may use the current value of the compensation signal SC as a charging current or a discharging current of the internal voltage. The controller 111 may increase or decrease the duty cycle of the control signal based on the charge change speed of the internal voltage.

In the embodiment, the feedback circuit 230 further includes resistors R1 and R2. The resistor R1 is electrically connected between the second terminal of the semiconductor element 2312 and the first terminal of the voltage stabilization impedance circuit 2322. The resistor R2 is electrically connected between the first terminal of the voltage stabilization impedance circuit 2322 and the anode of the light emitting element 2331. The disclosure is not limited thereto. In some embodiments, at least one of the resistors R1 and R2 may be omitted.

For example, the compensation signal generation circuit 233 may be implemented by a "PC817" element (although the disclosure is not limited thereto).

To sum up, the feedback circuit of the disclosure includes a feedback voltage generation circuit. The feedback voltage generation circuit generates the feedback voltage according to the bias voltage and the output voltage. The voltage value of the feedback voltage is lower than the voltage value of the bias voltage. The voltage value of the feedback voltage varies with the change of the output voltage. The voltage value of the feedback voltage is limited to be lower than the voltage value of the bias voltage. In this way, the power consumption of the feedback circuit may be reduced. The efficiency of the power supply device may increase due to the low power consumption of the feedback circuit itself.

Although the disclosure has been described with reference to the embodiments above, the embodiments are not intended to limit the disclosure. Any person skilled in the art may make some changes and modifications without departing from the spirit and scope of the disclosure. Therefore, the scope of the disclosure will be defined in the appended claims.

What is claimed is:

1. A feedback circuit for a power supply device, wherein the power supply device comprises a primary side circuit and a secondary side circuit, and the feedback circuit comprises:
    a feedback voltage generation circuit, electrically connected to the secondary side circuit, and configured to receive a bias voltage and an output voltage of the power supply device and generate a feedback voltage according to the bias voltage and the output voltage;
    a base voltage generation circuit, electrically connected to the feedback voltage generation circuit, and configured to provide a base voltage according to the feedback voltage; and
    a compensation signal generation circuit, electrically connected to the feedback voltage generation circuit and a controller, and configured to generate a compensation signal according to the feedback voltage and the base voltage and provide the compensation signal to the controller in the primary side circuit,
    wherein the feedback voltage generation circuit comprises:
        a voltage division circuit, configured to divide the output voltage to generate a division voltage; and
        a semiconductor element, wherein a first terminal of the semiconductor element receives the bias voltage, a second terminal of the semiconductor element is electrically connected to the base voltage generation circuit, and a control terminal of the semiconductor element receives the division voltage,
    wherein a voltage value of the feedback voltage is lower than a voltage value of the bias voltage, and
    the voltage value of the feedback voltage varies with a change of the output voltage.

2. The feedback circuit according to claim 1, wherein the voltage division circuit comprises:
    a first voltage division resistor, wherein a first terminal of the first voltage division resistor receives the output voltage, and a second terminal of the first voltage division resistor is electrically connected to the control terminal of the semiconductor element; and
    a second voltage division resistor, wherein a first terminal of the second voltage division resistor receives the output voltage, and a second terminal of the second voltage division resistor is electrically connected to a reference low voltage of the secondary side circuit.

3. The feedback circuit according to claim 1, wherein the semiconductor element is implemented by a bipolar junction transistor.

4. The feedback circuit according to claim 1, wherein the base voltage generation circuit comprises:
- a voltage stabilizer, wherein a first terminal of the voltage stabilizer is electrically connected to the compensation signal generation circuit, and a second terminal of the voltage stabilizer is electrically connected to a reference low voltage of the secondary side circuit;
- a first voltage stabilization impedance circuit, wherein a first terminal of the first voltage stabilization impedance circuit is electrically connected to the compensation signal generation circuit and the second terminal of the semiconductor element, and a second terminal of the first voltage stabilization impedance circuit is electrically connected to a reference terminal of the voltage stabilizer;
- a second voltage stabilization impedance circuit, wherein the second voltage stabilization impedance circuit is electrically connected between the first terminal of the voltage stabilizer and the reference terminal of the voltage stabilizer; and
- a third voltage stabilization impedance circuit, wherein the third voltage stabilization impedance circuit is electrically connected between the reference terminal of the voltage stabilizer and the second terminal of the voltage stabilizer.

5. The feedback circuit according to claim 4, wherein the first voltage stabilization impedance circuit and the third voltage stabilization impedance circuit are respectively resistors.

6. The feedback circuit according to claim 4, wherein the second voltage stabilization impedance circuit is a resistor-capacitor circuit.

7. The feedback circuit according to claim 4, wherein the voltage stabilizer is provided with the base voltage by the first terminal of the voltage stabilizer.

8. The feedback circuit according to claim 4, wherein:
- the compensation signal generation circuit generates a feedback voltage difference value according to the voltage value of the feedback voltage and the base voltage and generates the compensation signal according to the feedback voltage difference value, and
- the controller controls the primary side circuit in response to the compensation signal.

9. The feedback circuit according to claim 8, wherein the compensation signal generation circuit comprises:
- a light emitting element, wherein an anode of the light emitting element is electrically connected to the first terminal of the first voltage stabilization impedance circuit, a cathode of the light emitting element is electrically connected to the first terminal of the voltage stabilizer, and the light-emitting element provides a light signal in response to the feedback voltage difference value; and
- a photodiode, wherein a first terminal of the photodiode is electrically connected to the controller, a second terminal of the photodiode is electrically connected to the reference low voltage of the primary side circuit, and a receiving terminal of the photodiode is configured to receive the light signal.

* * * * *